United States Patent
Bono et al.

(10) Patent No.: US 10,146,782 B1
(45) Date of Patent: Dec. 4, 2018

(54) SECURE ERASURE OF FILES BY A FILESYSTEM

(71) Applicant: EMC Corporation, Hopkinton, MA (US)

(72) Inventors: Jean-Pierre Bono, Westborough, MA (US); William C. Davenport, San Diego, CA (US); George Danforth McNair, Jr., Portland, OR (US)

(73) Assignee: EMC IP Holding Company LLC, Hopkinton, MA (US)

( * ) Notice: Subject to any disclaimer, the term of this patent is extended or adjusted under 35 U.S.C. 154(b) by 516 days.

(21) Appl. No.: 14/755,248

(22) Filed: Jun. 30, 2015

(51) Int. Cl.
*G06F 17/00* (2006.01)
*G06F 17/30* (2006.01)

(52) U.S. Cl.
CPC .... *G06F 17/30117* (2013.01); *G06F 17/3007* (2013.01)

(58) Field of Classification Search
CPC .............. G06F 17/30117; G06F 21/6218
See application file for complete search history.

(56) References Cited

U.S. PATENT DOCUMENTS

| 7,475,203 | B1 | 1/2009 | Petrillo, Jr. et al. |
| 8,082,403 | B1 | 12/2011 | Allen et al. |
| 8,130,554 | B1 | 3/2012 | Linnell |
| 2007/0220277 | A1* | 9/2007 | Osaki ............ G06F 21/6245 713/193 |
| 2012/0278529 | A1* | 11/2012 | Hars ............ G06F 12/0246 711/103 |
| 2013/0185555 | A1* | 7/2013 | Wang ............ G06F 17/30117 713/165 |
| 2018/0025025 | A1* | 1/2018 | Davis ............ G06F 17/30203 |

OTHER PUBLICATIONS

Michael Wei, et al., "Reliably Erasing Data From Flash-Based Solid State Drives," Proc. 9th USENIX Conference on File and Storage Technologies, 2011, 13 pages, USENIX Association, Berkeley, CA.

* cited by examiner

*Primary Examiner* — Cheryl Lewis
(74) *Attorney, Agent, or Firm* — BainwoodHuang

(57) ABSTRACT

In one embodiment, a method is performed by a computing device configured to manage a filesystem stored on persistent storage. The method includes (a) receiving a command to delete a range of a file of the filesystem, (b) removing blocks of the range from being accessible to the filesystem as part of the file, (c) overwriting a block of the range using a secure erasure technique, and (d) subsequent to overwriting the block, freeing the block for re-use by the filesystem. A data storage system, apparatus, and computer program product for performing a similar method are also provided.

19 Claims, 5 Drawing Sheets

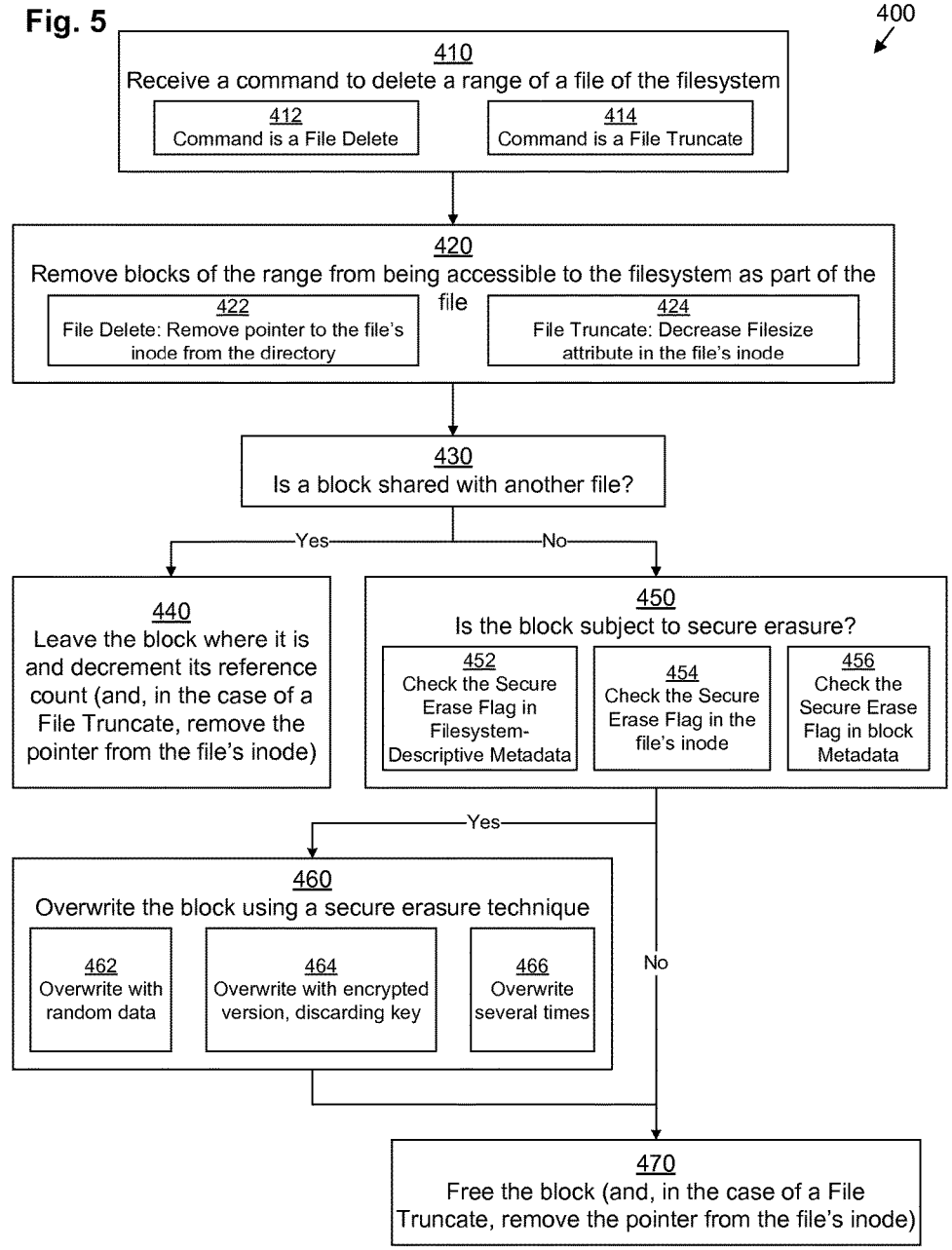

SECURE ERASURE OF FILES BY A FILESYSTEM

BACKGROUND

Hard disks and other forms of persistent data storage are used to store data for arbitrarily long periods of time. When data is no longer needed, it may be deleted from persistent storage. Deletion is typically performed by configuring filesystem metadata to no longer make blocks of a file available to users in connection with that file. However, the underlying blocks containing the file data may be retained until the filesystem reuses them. In certain circumstances, organizations with high security needs may physically destroy or otherwise clean their discarded hard drives to ensure that secret data does not fall into the wrong hands.

In some examples, organizations run programs on host computers to securely delete entire filesystems containing sensitive data. Such secure deletion may involve writing random data over the entire volume multiple times, to remove traces of previous data that may have been left behind.

SUMMARY

Unfortunately, the above-described conventional approaches may suffer from deficiencies. It is cumbersome and sometimes wasteful to destroy or securely clean an entire disk. Secure deletion of filesystems by host computers is an improvement, but such deletion programs operate at the coarse granularity of filesystems, and thus lack specificity. Also, host-based secure deletion programs place additional burdens on system administrators, who must keep track of sensitive information and attempts to delete it. In addition, when a filesystem is defragmented, the old data may remain on disk indefinitely.

Thus, it would be desirable to implement a technique in which deleted and truncated files can be securely erased automatically by a filesystem without requiring administrative input for each deletion. This may be accomplished by identifying sensitive content and configuring a filesystem manager to securely overwrite any block storing any of the sensitive content prior to freeing that block for later re-use. In some embodiments, this may be done with reference to a secure erase flag that indicates whether a given filesystem, file, or block is subject to a requirement for secure erasure.

In one embodiment, a method is performed by a computing device configured to manage a filesystem stored on persistent storage. The method includes (a) receiving a command to delete a range of a file of the filesystem, (b) removing blocks of the range from being accessible to the filesystem as part of the file, (c) overwriting a block of the range using a secure erasure technique, and (d) subsequent to overwriting the block, freeing the block for re-use by the filesystem. A data storage system, apparatus, and computer program product for performing a similar method are also provided.

BRIEF DESCRIPTION OF THE DRAWINGS

The foregoing and other objects, features, and advantages will be apparent from the following description of particular embodiments of the present disclosure, as illustrated in the accompanying drawings in which like reference characters refer to the same parts throughout the different views.

FIG. 5 is a flowchart depicting an example method according to various embodiments.

DETAILED DESCRIPTION

Embodiments are directed to techniques for a system in which data blocks of deleted and truncated files can be securely erased automatically by the filesystem without requiring administrative input for each deletion. This may be accomplished by identifying sensitive content and configuring a filesystem manager to securely overwrite any block storing any of the sensitive content prior to freeing that block for later re-use. In some embodiments, this may be done with reference to a secure erase flag that indicates whether a given filesystem, file, or block is subject to a requirement for secure erasure.

Figure 1:
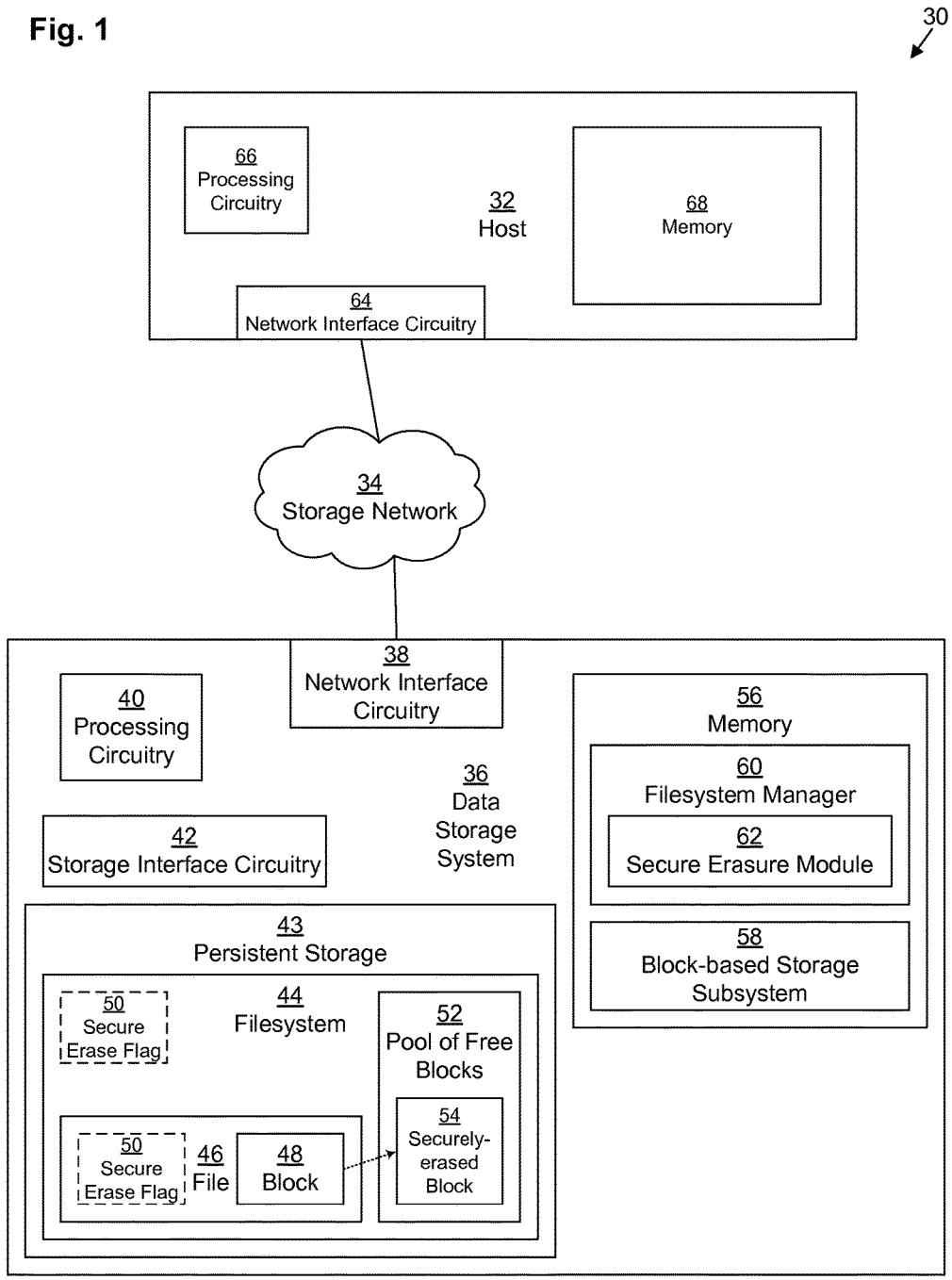
FIG. 1 is a block diagram depicting an example system and apparatus for use in connection with various embodiments.

FIG. 1 depicts a system 30. System 30 includes one or more host computers 32 connected to a data storage system (DSS) 36 over one or more storage networks 34. DSS 36 may be, for example, a VNX® series data storage system provided by the EMC Corporation of Hopkinton, Mass. DSS 36 is typically housed in one or more storage cabinets (not depicted). However, in some embodiments, DSS 36 may be a dispersed system operating across a network.

Host computer 32 may be any kind of computing device including a personal computer, a laptop computer, a mobile computer, a smartphone, a workstation computer, a server computer, an enterprise server, etc.

Storage network 34 may be any kind of network, including a local area network, a wide area network, a storage area network, an Ethernet network, a Fibre-Channel network, a Wireless Fidelity (WiFi) wireless network, a cellular data network, a point-to-point connection, a fabric of connections, etc., or some combination thereof.

DSS 36 includes network interface circuitry 38 for interfacing with network 34, processing circuitry 40, storage interface circuitry 42 configured to provide access to persistent storage 43, and memory 56. These devices may be interconnected as is well-known in the art. Network interface circuitry 38 may include one or more Ethernet cards, cellular modems, Fibre Channel adapters, WiFi wireless networking adapters, any other devices for connecting to network 34, or some combination thereof. Processing circuitry 40 may be any kind of processor or set of processors configured to perform operations, such as, for example, a microprocessor, a multi-core microprocessor, a digital signal processor, a system on a chip, a collection of electronic circuits, a similar kind of controller, or any combination of the above.

Storage interface circuitry 42 may include one or more SCSI adapters, Fibre Channel adapters, any other devices configured to connect to disks of persistent storage 43, or some combination thereof. In some embodiments, storage interface circuitry 42 may also include adapters configured to provide access to remote disks.

Persistent storage 43 may include one or more of any kind of persistent storage drives, such as, for example, magnetic hard disk drives and/or flash-based solid state disk drives. There may be any number of disks within persistent storage 43. Persistent storage 43 includes a set of logical volumes (not depicted), and at least one of the logical volumes store a filesystem 44. Filesystem 44 stores at least one file 46, which includes at least one data block 48. File 46 may be a directory, which is a type of file. In some embodiments, metadata for file 46 includes a secure erase flag 50, which indicates whether or not that file 46 is subject to secure erasure (meaning that, when it is deleted or truncated, any block 48 of that file 46 should be securely overwritten before being release to a pool of free blocks 52 as a securely-erased block 54). In some embodiments, instead of the secure erase flag 50 being stored as part of the file 46, the secure erase flag 50 is stored in connection with the entire filesystem 44, applying to all files within the filesystem 44. In other embodiments (not depicted), secure erase flags 50 are stored in connection with every block 48.

Memory 56 may be any kind of digital system memory, such as, for example, random access memory (RAM). Memory 56 stores one or more operating systems (OSes) in operation (not depicted, e.g., Linux, UNIX, Windows, or a similar OS), a block-based storage subsystem 58 in operation, and one or more applications executing on processing circuitry 40 as well as data used by those applications. Block-based storage subsystem 58 may include one or more software modules configured to receive and process block-based storage requests from hosts 32, serving responses with respect to persistent storage 43. Memory 56 may also include a filesystem manager 60 configured to manage one or more filesystems 44 and to process file-based requests from hosts 32. Filesystem manager 60 includes a secure erasure module 62 that is configured to securely erase blocks 48 of files 46 upon deletion when marked for secure erasure by a secure erasure flag 50 of appropriate scope. In some embodiments (not depicted), filesystem manager 60 and secure erasure module 62 may operate off of the DSS 36, (e.g., on a host 32). The OS and the applications (e.g., block-based storage subsystem 58 and filesystem manager 60) are typically also stored in persistent storage 43 so that they may be loaded into memory 56 from persistent storage 43 upon a system restart. These applications, when stored in non-transient form either in the memory 56 or in persistent storage 43, form a computer program product. The processing circuitry 40 running one or more of these applications thus forms a specialized circuit constructed and arranged to carry out the various processes described herein.

Host 32 includes network interface circuitry 64, processing circuitry 66, and memory 68. These devices may be interconnected as is well-known in the art. Network interface circuitry 64 may include one or more Ethernet cards, cellular modems, Fibre Channel adapters, WiFi wireless networking adapters, any other devices for connecting to network 34, or some combination thereof. Processing circuitry 66 may be any kind of processor or set of processors configured to perform operations, such as, for example, a microprocessor, a multi-core microprocessor, a digital signal processor, a system on a chip, a collection of electronic circuits, a similar kind of controller, or any combination of the above.

Memory 68 may be any kind of digital system memory, such as, for example, RAM. Memory 68 stores one or more OSes in operation (not depicted, e.g., Linux, UNIX, Windows, or a similar OS) and one or more applications executing on processing circuitry 66 as well as data used by those applications. In some embodiments (not depicted), as mentioned above, memory 68 may also include filesystem manager 60 configured to remotely manage one or more filesystems 44 of the DSS 36 and to process file-based requests from one or more applications (not depicted) running on the host 32 or on another device. Filesystem manager 60 includes secure erasure module 62 that is configured to securely erase blocks 48 of files 46 upon deletion when marked for secure erasure by a secure erasure flag 50 of appropriate scope. In some embodiments, memory 68 may also include a persistent storage portion (not depicted). This persistent storage portion may be made up of one or more persistent storage devices, such as, for example, hard disk drives, solid-state storage devices, flash drives, etc. Persistent storage is configured to store programs and data even while the host 32 is powered off. The OS (e.g., Linux, UNIX, Windows, or a similar operating system) and the applications (e.g., filesystem manager 60) are typically stored in persistent storage so that they may be loaded into memory 68 from persistent storage upon a system restart. These applications, when stored in non-transient form either in the volatile portion of memory 68 or in persistent storage, form a computer program product. The processing circuitry 66 running one or more of these applications thus forms a specialized circuit constructed and arranged to carry out the various processes described herein.

Figure 2:
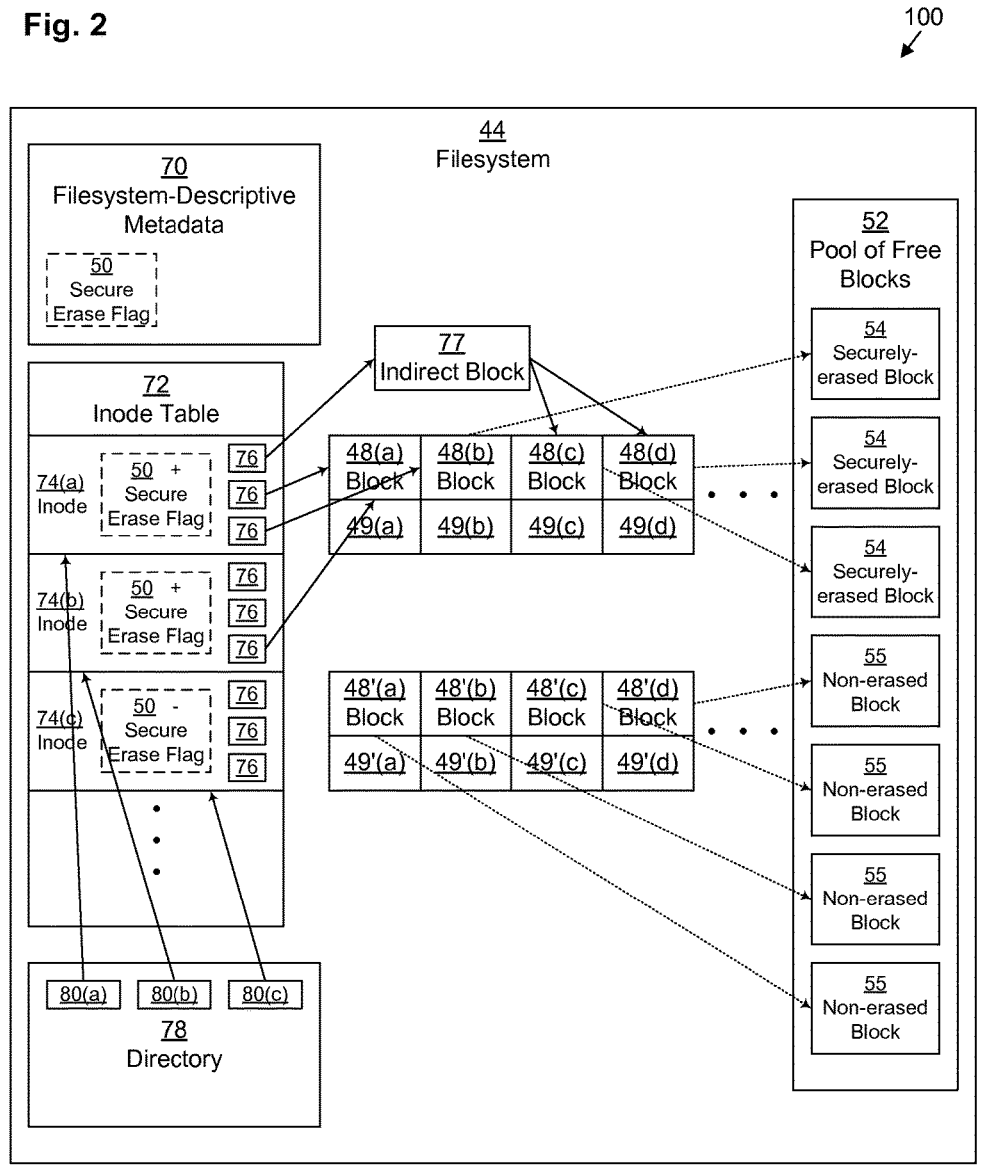
FIG. 2 is a block diagram depicting an example filesystem configuration for use in connection with various embodiments.

FIG. 2 depicts an example configuration 100 of filesystem 44 according to several embodiments. As depicted, filesystem 44 includes filesystem-descriptive metadata 70, which is metadata that applies to the filesystem 44 overall. In some embodiments, filesystem-descriptive metadata 70 may be a Unix superblock, storing a type, size, and status of the filesystem 44 as well as information about metadata structures within the filesystem. In some embodiments, filesystem-descriptive metadata 70 may store a secure erase flag 50 to apply to deletions and truncations within that filesystem 44. Secure erase flag 50 may, in some embodiments, be a binary flag, which, when set to true, indicates that, upon deleting any data block 48 within the filesystem, that data block 48 should be overwritten prior to being freed to the pool 52. On the other hand, when secure erase flag 50 is set to false, it indicates that upon deleting any data block 48 within the filesystem, that data block 48 need not be overwritten prior to being freed to the pool 52, which represents the normal mode of operation of a typical filesystem. In other embodiments, secure erase flag 50 may be a non-binary flag able to encode more than two values, allowing, for example, for a selection of a particular type of secure erasure to be enabled.

Filesystem 44 also includes one or more inode tables 72 for storing inodes 74 (depicted as inodes 74(a), 74(b), 74(c), . . . ). As is well known in the art, an inode 74 represents a file 46 or a directory 78, containing certain information about the file 46 including a set of pointers 76 to blocks 48 of the file 46. Some of the pointers 76 may point to indirect blocks 77, which in turn point to the blocks 48 of the file 46 or to other indirect blocks 77.

In some embodiments, instead of the secure erase flag 50 being stored within filesystem-descriptive metadata 70 and applying to the entire filesystem 44, each inode 74 may include a secure erase flag 50 to indicate whether its respective file 46 is subject to secure erasure.

As depicted in FIG. 2, directory 78 includes three file entries 80(a), 80(b), 80(c), for three files 46 within that directory 78, each file entry 80 pointing to a particular inode 74 associated with its file 46. File entry 80(a) points to inode 74(a), file entry 80(b) points to inode 74(b), and file entry 80(*c*) points to inode 74(*c*). Mode 74(*a*) contains direct pointers 76 to blocks 48(*a*) and 48(*b*) of a file 46 as well as a pointer 76 to an indirect block 77 that further points to blocks 48(*c*) and 48(*d*) of the file. In one embodiment, inode 74(*a*) also stores a secure erase flag 50 with an affirmative value (indicated by the "+"), indicating that the blocks 48(*a*), 48(*b*), 48(*c*), 48(*d*) of the file are all subject to secure erasure.

As depicted, inode 74(*b*) contains a direct pointer 76 to block 48(*a*). In some embodiments, instead of pointer 76 pointing directly to the block 48(*a*), pointer 76 may instead point to an intermediate data structure used to effectuate the sharing of blocks. Thus, block 48(*a*) is shared between the files of inodes 74(*a*) and 74(*b*). In one embodiment, inode 74(*b*) also stores a secure erase flag 50 with an affirmative value (indicated by the "+"), indicating that the block 48(*a*) of the file is subject to secure erasure.

As depicted, inode 74(*c*) contains pointers 76 which point to blocks 48'(a), 48'(b), 48'(c), and 48'(d) of its respective file (the actual pointing lines are not depicted, nor are any indirect blocks depicted for the sake of simplicity). In one embodiment, inode 74(*c*) also stores a secure erase flag 50 with a negative value (indicated by the "−"), indicating that the blocks 48'(a), 48'(b), 48'(c), 48'(d) of the file are not subject to secure erasure.

Each block 48 may have an associated piece of block metadata 49. Thus, blocks 48(*a*), 48(*b*), 48(*c*), and 48(*d*) are respectively associated with block metadata 49(*a*), 49(*b*), 49(*c*), and 49(*d*), while blocks 48'(a), 48'(b), 48'(c), and 48'(d) are respectively associated with block metadata 49'(a), 49'(b), 49'(c), and 49'(d). The block metadata 49 may include various information about each block, such as, for example, a reference count (not depicted) indicating how many different files 46 point to its associated block 48. Thus, in one embodiment, block metadata 49(*a*) includes a reference count of 2 since its associated block 48(*a*) is pointed to by inode 74(*a*) and inode 74(*b*), while block metadata 49(*b*), 49(*c*), 49(*d*), 49'(a), 49'(b), 49'(c), and 49'(d) all have a reference count of 1, since their respective associated blocks 48 are each only pointed to by a single inode 74. In another embodiment, the reference count for a block 48 may include a number larger than the number of inodes 74 that point to that block, each file 46 being able to use a weighted value for its contribution to the reference count. Typically the block metadata 49 for several blocks 48 is aggregated together and stored within a single block of storage (not depicted).

If filesystem manager 60 receives a command to delete the file 46 associated with inode 74(*a*), then, since block 48(*a*) is also pointed to by another inode 74(*b*) (as indicated by the reference count within block metadata 49(*a*)), filesystem manager 60 will not free block 48(*a*) upon deleting the file 46. However, blocks 48(*b*), 48(*c*), and 48(*d*) can be freed. But first, secure erasure module 62 checks the secure erasure flag 50 for the inode 74(*a*) (or, in other embodiments, secure erasure module 62 may check the secure erasure flag 50 stored elsewhere), and finding that it stores an affirmative value, secure erasure module 62 will securely overwrite each of blocks 48(*b*), 48(*c*), and 48(*d*) prior to freeing them to the pool 52 as securely-erased blocks 54. In some embodiments, this secure overwriting may be done by writing random data over the entirety of the block 54, while in other embodiments, this secure overwriting may be done by encrypting the contents of the block 48, writing the encrypted contents back to that block 48, and discarding the key used for encryption, refraining from storing the key anywhere in persistent storage 43 or elsewhere. In some embodiments, secure erasure module 62 performs the secure overwriting in several passes, writing data to each block 54 several times, either with random data each time, with encrypted data (with different keys) each time, or with a combination of different patterns (e.g., random, followed by all ones, followed by encrypted, followed by all zeros, followed by random again). Filesystem manager 60 also removes file entry 80(*a*) from directory 78 (typically before overwriting any of the blocks 48) and also frees inode 74(*a*) and indirect block 77 for reuse (after freeing the blocks 48 of the file 46).

If filesystem manager 60 receives a command to delete the file 46 associated with inode 74(*c*), then, since none of the blocks 48'(a), 48'(b), 48'(c), and 48'(d) of that file are pointed to by any other inode 74 (as indicated by the reference counts within block metadata 49'(a-d)), secure erasure module 62 checks the secure erasure flag 50 for the inode 74(*c*) (or, in other embodiments, secure erasure module 62 may check the secure erasure flag 50 stored elsewhere), and finding that it stores a negative value, secure erasure module 62 will refrain from securely overwriting each of blocks 48'(a), 48'(b), 48'(c), and 48'(d) prior to freeing them to the pool 52 as non-erased blocks 55. Filesystem manager 60 also removes file entry 80(*c*) from directory 78 (typically before overwriting any of the blocks 48) and also frees inode 74(*c*) and any of its indirect blocks 77 for reuse (after freeing the blocks 48 of the file 46).

Figure 3:
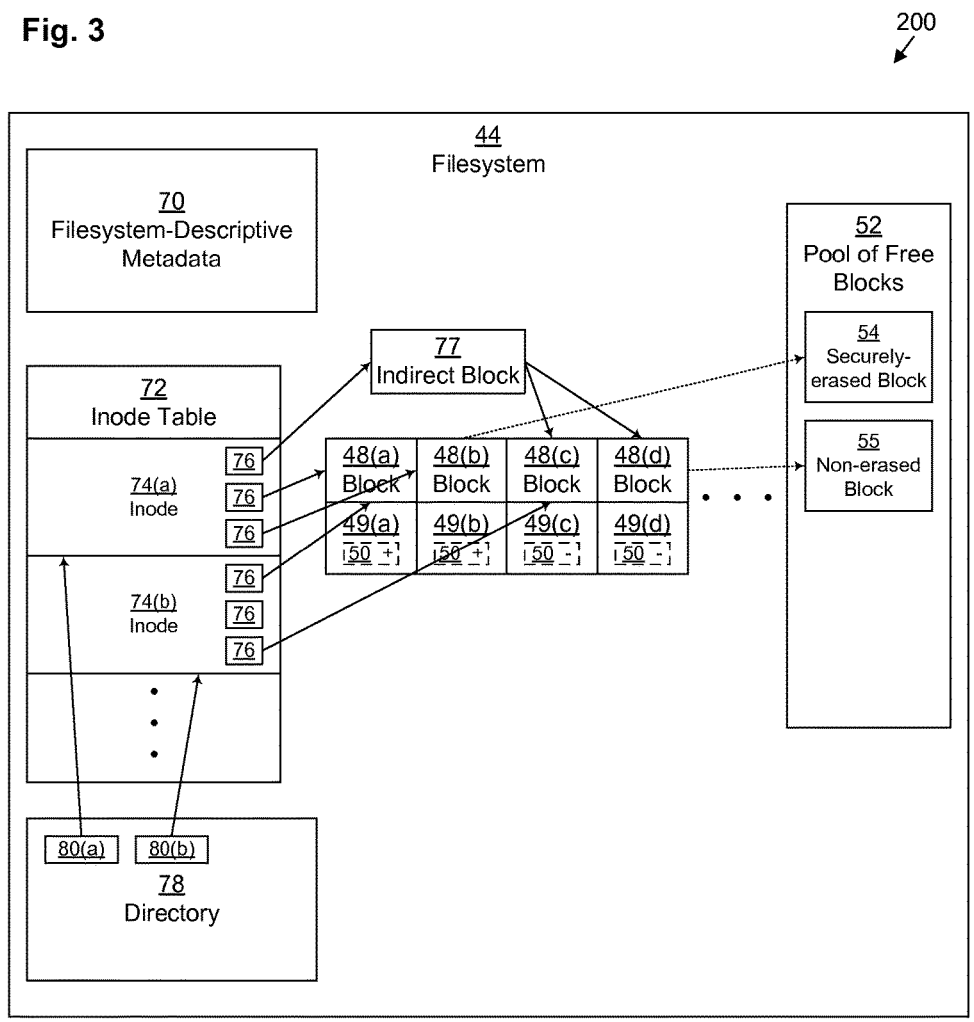
FIG. 3 is a block diagram depicting an example filesystem configuration for use in connection with various embodiments.

FIG. 3 depicts another example configuration 200 of filesystem 44 according to several embodiments. Different from configuration 100, in configuration 200, filesystem 44 does not store a secure erasure flag 50 in either the filesystem-descriptive metadata 70 or in the inodes 74, but rather, a secure erasure flag 50 is stored within the block metadata 49 for every block 48.

As depicted in FIG. 3, directory 78 includes two file entries 80(*a*), 80(*b*) for two files 46 within that directory 78, each file entry 80 pointing to a particular inode 74 associated with its file 46. File entry 80(*a*) points to inode 74(*a*) and file entry 80(*b*) points to inode 74(*b*). Inode 74(*a*) contains direct pointers 76 to blocks 48(*a*) and 48(*b*) of a file 46 as well as a pointer 76 to an indirect block 77 that further points to blocks 48(*c*) and 48(*d*) of the file.

As depicted, inode 74(*b*) contains pointers 76 to blocks 48(*a*) and 48(*c*). Thus, blocks 48(*a*) and 48(*c*) are both shared between the files of inodes 74(*a*) and 74(*b*).

Each block 48 has an associated piece of block metadata 49. Thus, blocks 48(*a*), 48(*b*), 48(*c*), and 48(*d*) are respectively associated with block metadata 49(*a*), 49(*b*), 49(*c*), and 49(*d*). The block metadata 49 may include various information about each block, such as, for example, a reference count (not depicted) indicating how many different files 46 point to its associated block 48. Thus, in one embodiment, block metadata 49(*a*) and 49(*c*) each include a reference count of 2 since their associated blocks 48(*a*) and 48(*c*) are each pointed to by inode 74(*a*) and inode 74(*b*), while block metadata 49(*b*) and 49(*d*) all have a reference count of 1, since their respective associated blocks 48 are each only pointed to by a single inode 74. The block metadata 49 also each store a secure erase flag 50. As depicted, the secure erase flag 50 within block metadata 49(*a*) and 49(*b*) both have an affirmative value (indicated by the "+"), indicating that blocks 48(*a*) and 48(*b*) are both subject to secure erasure. However, the secure erase flag 50 within block metadata 49(*c*) and 49(*d*) both have a negative value (indicated by the "−"), indicating that neither of blocks 48(*c*) and 48(*d*) are subject to secure erasure.

If filesystem manager 60 receives a command to delete the file 46 associated with inode 74(*a*), then, since blocks 48(*a*) and 48(*c*) are also pointed to by another inode 74(*b*)

(as indicated by the reference count within block metadata 49(a), 49(c)), filesystem manager 60 will not free blocks 48(a), 48(c) upon deleting the file 46. However, blocks 48(b) and 48(d) can be freed, but first, secure erasure module 62 checks the secure erasure flag 50 within the block metadata 49(b), 49(d) for each block 48(c), 48(d). Since the secure erasure flag 50 within the block metadata 49(b) of block 48(b) has an affirmative value, secure erasure module 62 will securely overwrite block 48(b) prior to freeing it to the pool 52 as securely-erased block 54. However, because the secure erasure flag 50 within the block metadata 49(d) of block 48(d) has a negative value, secure erasure module 62 will not securely overwrite block 48(d) prior to freeing it to the pool 52 as non-erased block 55. Filesystem manager 60 also removes file entry 80(a) from directory 78 (typically before overwriting any of the blocks 48) and also frees inode 74(a) and indirect block 77 for reuse (after freeing the blocks 48 of the file 46).

Figure 4:
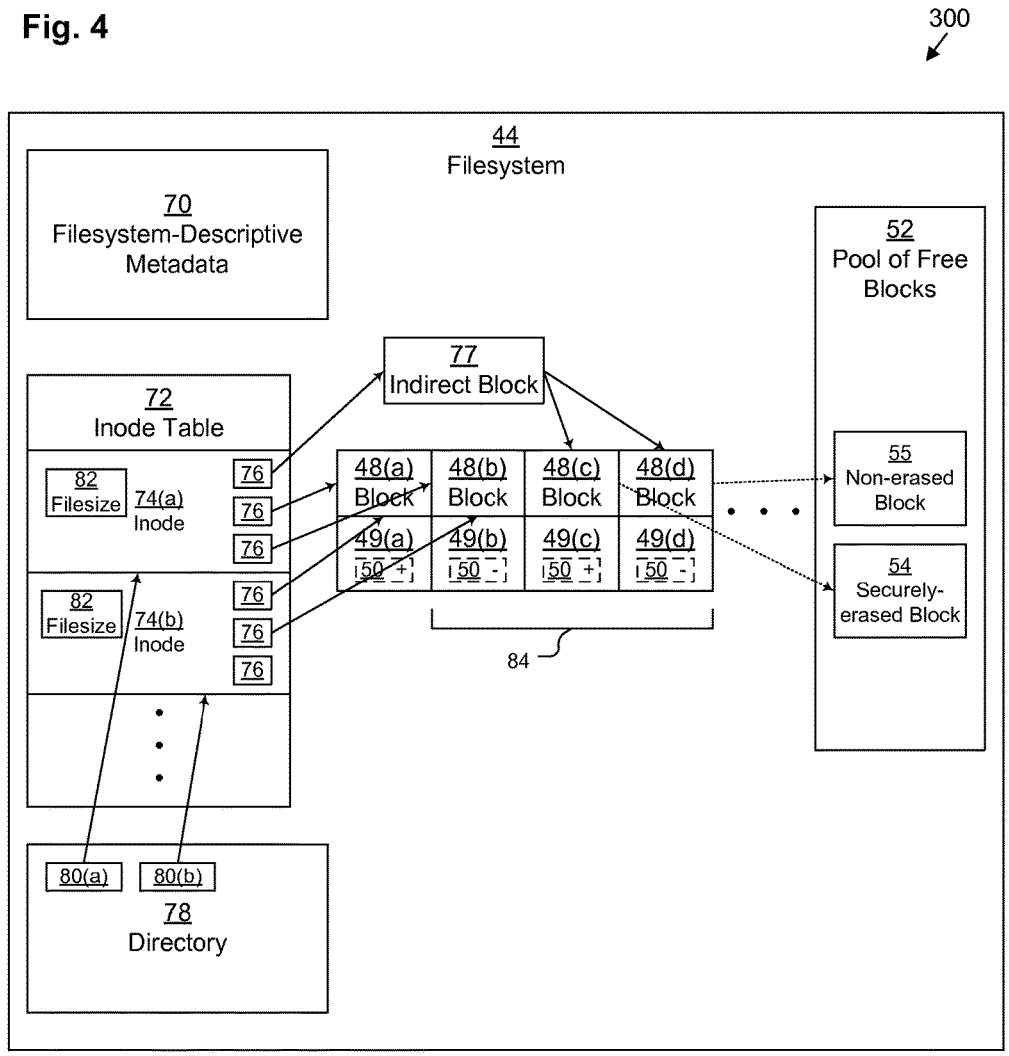
FIG. 4 is a block diagram depicting an example filesystem configuration for use in connection with various embodiments.

FIG. 4 depicts another example configuration 300 of filesystem 44 according to several embodiments. Configuration 300 is similar to configuration 200, except that instead of receiving a command to delete a file 46, filesystem manager 60 receives a truncate command to delete a range 84 of blocks 48 at the end of a file 46 (although in some embodiments, range 84 may be located elsewhere within the file's address space, for example, in the case of the removal of blocks logically placed in the middle of a sparse file). As depicted, range 84 includes blocks 48(b), 48(c), and 48(d), but not 48(a). FIG. 4 also depicts a filesize attribute 82 stored within each inode 74 (although this attribute may also be present in configurations 100 and 200, although it is not depicted there for simplicity). Filesize attribute 82 stores a length of the file associated with the inode 74 either in bytes or blocks or some other measure.

Upon receiving the truncate command, filesystem manager 60 reduces the value of the filesize attribute 82 to reflect the new filesize after truncation. Thus, as depicted, the filesize attribute 82 will be decreased from 4 blocks (or, 16 KB, assuming a 4-KB block size) to 1 block (or 4 KB). Then, since block 48(c) is also pointed to by another inode 74(b) (as indicated by the reference count within block metadata 49(c)), filesystem manager 60 will not free block 48(c) upon truncating the file 46. However, blocks 48(b) and 48(d) can be freed; but first, secure erasure module 62 checks the secure erasure flag 50 within the block metadata 49(b), 49(d) for each block 48(c), 48(d). Since the secure erasure flag 50 within the block metadata 49(b) of block 48(b) has an affirmative value, secure erasure module 62 will securely overwrite block 48(b) prior to freeing it to the pool 52 as securely-erased block 54. However, because the secure erasure flag 50 within the block metadata 49(d) of block 48(d) has a negative value, secure erasure module 62 will not securely overwrite block 48(d) prior to freeing it to the pool 52 as non-erased block 55. Filesystem manager 60 does not free block 48(a) because 48(a) is not part of the range 84, and filesystem manager 60 also does not remove file entry 80(a) from directory 78 or free inode 74(a) for reuse because the file 46 remains in place after a truncation.

FIG. 5 illustrates an example method 400 performed by filesystem manager 60 for automatically securely erasing blocks 48 of files 46 that are deleted or truncated in a manner that does not break other files that may share blocks 48 with the deleted file 46. It should be understood that any time a piece of software (e.g., filesystem manager 60, secure erasure module 62, or block-based storage subsystem 58) is described as performing a method, process, step, or function, in actuality what is meant is that a computing device or distributed computing system (e.g., DSS 36 or host 32) on which that piece of software is running performs the method, process, step, or function when executing that piece of software on its processing circuitry 40, 66. It should be understood that although depicted in one order, one or more steps or sub-steps may be combined together or performed in a different order.

In step 410, filesystem manager 60 receives a command to delete a range 84 of a file 46 of the filesystem 44. In some embodiments, step 410 is embodied in sub-step 412, in which the command is a file delete command to entirely delete the file 46 (see FIGS. 2 and 3), in which case the range 84 includes all blocks 48 of the file 46. In other embodiments, step 410 is embodied in sub-step 414, in which command is a file truncate command to remove blocks 48 from range 84 at the end of the file 46 (see FIG. 4). In other embodiments (not depicted), step 410 may be embodied by receiving a command to delete blocks from the middle of a sparse file. In yet other embodiments (not depicted), step 410 may be embodied by receiving a command to defragment a filesystem 44, upon which certain blocks 48 within various files 46 of the filesystem may be moved to new locations, the data at the old locations being deleted. It should be understood that the file being deleted or truncated may actually be a directory.

In step 420, in response to receiving the command, the filesystem manager 60 removes the blocks 48 of the range 84 from being accessible to the filesystem 44 as part of the file 46. In the event of a file delete command, step 420 is realized by sub-step 422, in which filesystem manager 60 removes a pointer (e.g., within a file entry 80) to the inode 74 of the file 46 from the directory 78 so that a user is no longer able to see the file 46 within the structure of the filesystem. In some embodiments, in which asynchronous deletion is done, the filesystem manager 60 may, at this point, report back to the application that requested the deletion that the file 46 has been deleted. In such embodiments, the later steps may be carried out at a later time by a background process.

In the event of a file truncate command, step 420 is realized by sub-step 424, in which filesystem manager 60 decreases the size of the filesize attribute 82 within the inode 74 of the file 46 that a user is no longer able to see contents of the file 46 past the point of truncation. In some embodiments, in which asynchronous deletion is done, the filesystem manager 60 may, at this point, report back to the application that requested the deletion that the file 46 has been truncated.

It should be understood that step 420 may also be realized in other ways not depicted. Thus, in the case of a defragmentation operation, the filesystem manager 60 itself may keep track of blocks 48 within files 46 that have been deleted from within those files so that secure erasure module 62 may later determine whether those blocks 46 are to be securely erased or not.

In step 430, for each block 48 within the range 84, filesystem manager 60 checks whether or not that block 48 is shared with another file. Filesystem manager 60 achieves this by checking the block metadata 49 associated with that block 48 to see if the reference count indicates that any other inodes 74 are pointing to it. There are various reasons why this might happen. It could happen in the event of a hard link or in the event of a snapshot of the filesystem, in which a backup is made of the filesystem 44 that shares all the same data blocks 48 until changes are made to files 46 within the filesystem 44, in which case, changed blocks 48 are no longer shared. It could also happen in the event that the filesystem 44 is de-duplicated in order to save space by having multiple files share identical blocks 48 instead of storing identical blocks 48 in several locations.

It should be understood that if there is a hard link such that two files in two different directories share the same inode 74, then once the pointer to the inode 74 is removed from the directory 78 from which the file is being deleted, the reference count for the inode 74 itself would be checked, and the deletion would terminate at that point due to the hard link.

If the filesystem manager 60 determines that the block 48 is shared with another file, then operation proceeds with step 440. In step 440, filesystem manager 60 leaves the block 48 where it is and decrements its reference count within its block metadata 49. In the case of a File Truncate command, filesystem manager 60 also removes the pointer 76 to the removed block 48 from the inode 74 or the indirect block 77, as the case may be.

It should be understood that, under certain circumstances, it may be possible for a single block 48 to be pointed to by two different inodes 74, one of which is marked as subject to secure erasure and the other of which is not marked as subject to secure erasure (or, one inode 74 may be part of a filesystem 44 marked as subject to secure erasure while the other inode 74 may be part of a filesystem 44 not marked as subject to secure erasure). There are various ways to handle this scenario. In one embodiment, if any file 46 or filesystem 44 which points to the block 48 is marked as subject to secure erasure, then the block 48 is treated as if it were marked as subject to secure erasure, so when the last inode 74 marked as subject to secure erasure that points to that block 48 no longer points to that block (i.e., only inodes 74 not marked as subject to secure erasure remain), the block 46 is scheduled to be securely erased (step 460), even though it will leave a hole in the other files 46 that point to it not marked as subject to secure erasure. In another embodiment, if any file 46 or filesystem 44 which points to the block 48 is not marked as subject to secure erasure, then that block 48 is automatically treated as not subject to secure erasure. In another embodiment, the filesystem manager 60 exercises care to ensure that no block 48 is ever shared by some files 46 subject to secure erasure and other files 46 not subject to secure erasure. In those embodiments, if such a linkage is attempted to be made, a copy of the block 48 may be made such that only inodes 74 of files 46 subject to secure erasure point to one copy of the block 48 and only inodes 74 of files 46 not subject to secure erasure point to another copy of the block 48.

In yet another embodiment, secure erase flags 50 may be used at multiple levels of the hierarchy. Thus, if a block 48 is shared between one inode 74 that is marked as subject to secure erasure and another inode 74 that is not marked as subject to secure erasure, secure erasure module 62 may, upon being tasked with deleting the block in the context of the inode 74 that is marked as subject to secure erasure, mark a separate secure erase flag 50 within the block metadata 49 for that block 48. Thus, even though the block 48 is now part of a file 46 that is not marked as subject to secure erasure, the block 48 will be securely deleted even when deleted in the context of the file 46 that is not marked as subject to secure erasure.

If the filesystem manager 60 determines that the block 48 is not shared with another file, then operation proceeds with step 450. In step 450, secure erasure module 62 checks whether or not that block 48 is subject to secure erasure. Depending on the embodiment, step 450 is accomplished by one of sub-steps 452, 454, or 456. In sub-step 452, in one embodiment, secure erasure module 62 references the secure erase flag 50 within filesystem-descriptive metadata 70 for the filesystem 44 to determine whether or not the filesystem 44 as a whole is subject to secure erasure. In sub-step 454, in another embodiment, secure erasure module 62 references the secure erase flag 50 within the inode 74 of the file 46 that is being deleted or truncated to determine whether or not the blocks 48 of that file 46 are subject to secure erasure. In sub-step 456, in another embodiment, secure erasure module 62 references the secure erase flag 50 within the block metadata 49 of the block 48 being removed to determine whether or not that block 48 is subject to secure erasure.

If the secure erasure module 62 determines that the block 48 is subject to secure erasure, the operation proceeds with step 460. In step 460, secure erasure module 62 overwrites the block 48 using a secure erasure technique. Depending on the embodiment, step 460 is accomplished by one of sub-steps 462, 464, or 466. In sub-step 462, in one embodiment, secure erasure module 62 generates enough random data to fill one block and overwrites the block 48 with the randomly-generated data. In sub-step 464, in another embodiment, secure erasure module 62 encrypts the block 48 being removed using a key in such a way that the ciphertext is also as long as (or at least as long as) the input (e.g., using a stream cipher). Then, the secure erasure module 62 overwrites the block 48 with the ciphertext, discarding the key without storing it on persistent storage 43. In sub-step 464, in another embodiment, secure erasure module 62 generates several different sets of data with the length of a block, and overwrites the block 48 with those several different sets of data in sequence. In some embodiments, these sets of data may include different types of datasets, including, for example, random data, encrypted data, all zeros, all ones, any other pattern, or some combination of these. After step 460, operation proceeds with step 470.

If the secure erasure module 62 determined, in step 450, that the block 48 is not subject to secure erasure, then operation also proceeds with step 470. In step 470, filesystem manager 60 frees the block 48 by sending the block 48 to the pool 52 of available blocks. In the case of a File Truncate command, filesystem manager 60 also removes the pointer 76 to the removed block 46 from the inode 74 or the indirect block 77, as the case may be.

It should be understood that, in some embodiments, these techniques may be applied to a traditional filesystem operating over a standard disk, while in other embodiments, these techniques may be applied to an upper-deck filesystem that operates logically above a virtual volume that is created within a file of a lower-deck filesystem (also known as a container block filesystem). In yet other embodiments, these techniques may be applied to a lower-deck filesystem that is used to create files that represent virtual volumes.

Thus, techniques for automatically securely erasing blocks 48 of files 46 that are deleted or truncated by the filesystem manager 60 without requiring administrative input for each deletion. This may be accomplished by identifying sensitive content and configuring the filesystem manager 60 to securely overwrite any block 48 storing any of the sensitive content prior to freeing that block 48 for later re-use. In some embodiments, this may be done with reference to a secure erase flag 50 that indicates whether a given filesystem 44, file 46, or block 48 is subject to a requirement for secure erasure.

While various embodiments of the present disclosure have been particularly shown and described, it will be understood by those skilled in the art that various changes in form and details may be made therein without departing from the spirit and scope of the present disclosure as defined by the appended claims.

For example, it should be understood that although various embodiments have been described as being methods, software embodying these methods is also included. Thus, one embodiment includes a tangible computer-readable medium (such as, for example, a hard disk, a floppy disk, an optical disk, computer memory, flash memory, etc.) programmed with instructions, which, when performed by a computer or a set of computers, cause one or more of the methods described in various embodiments to be performed. Another embodiment includes a computer which is programmed to perform one or more of the methods described in various embodiments.

Finally, it should be understood that all embodiments which have been described may be combined in all possible combinations with each other, except to the extent that such combinations have been explicitly excluded.

Finally, even if a technique, method, apparatus, or other concept is specifically labeled as "conventional," Applicants make no admission that such technique, method, apparatus, or other concept is actually prior art under 35 U.S.C. § 102 or 35 U.S.C. § 103, such determination being a legal determination that depends upon many factors, not all of which are known to Applicants at this time.

What is claimed is:

1. A method performed by a computing device configured to manage a filesystem stored on persistent storage, the method comprising:
    receiving a command to delete a range of a file of the filesystem, wherein the range of the file includes a set of blocks and receiving the command to delete the range of the file includes receiving a truncate command to delete an end portion of the file, the end portion including the set of blocks that are no longer at all within the file;
    removing blocks of the range from being accessible to the filesystem as part of the file, wherein removing blocks of the range from being accessible to the filesystem as part of the file includes reducing a filesize attribute within metadata of the file;
    reading metadata of each block of the set of blocks to obtain a reference count for each block;
    determining that a block of the range has a reference count indicating that the block is not shared with any other file;
    overwriting the block using a secure erasure technique; and
    subsequent to overwriting the block, freeing the block for re-use by the filesystem.

2. The method of claim 1, wherein the method further comprises:
    determining that another block of the set of blocks has a reference count indicating that the other block is shared with another file; and
    in response to determining that the other block has a reference count indicating that the other block is shared with another file, refraining from freeing the other block for re-use by the filesystem.

3. The method of claim 1, wherein the method further comprises:
    reading metadata of each block of the set of blocks to obtain a value of a secure erase flag for each block; and
    determining that the block has a secure erase flag with a value indicating that the block is subject to secure erasure.

4. The method of claim 3, wherein the method further comprises:
    determining that another block of the set of blocks has a secure erase flag with a value indicating that the block is not subject to secure erasure; and
    in response to determining that the other block has a secure erase flag with a value indicating that the block is not subject to secure erasure, freeing the other block for re-use by the filesystem without first overwriting the other block.

5. The method of claim 1, wherein the method further comprises:
    reading metadata of the file to obtain a value of a secure erase flag for the file; and
    determining that the file has a secure erase flag with a value indicating that the file is subject to secure erasure.

6. The method of claim 5, wherein the method further comprises:
    receiving another command to delete another range of another file of the filesystem;
    reading metadata of the other file to obtain a value of a secure erase flag for the other file;
    determining that the other file has a secure erase flag with a value indicating that the other file is not subject to secure erasure;
    removing blocks of the other range from being accessible to the filesystem as part of the other file; and
    in response to determining that the other file has a secure erase flag with a value indicating that the other file is not subject to secure erasure, freeing the blocks of the other range for re-use by the filesystem without first overwriting the blocks of the other range.

7. The method of claim 1, wherein the method further comprises:
    reading metadata of the filesystem to obtain a value of a secure erase flag for the filesystem; and
    determining that the filesystem has a secure erase flag with a value indicating that the filesystem is subject to secure erasure.

8. The method of claim 7, wherein the method further comprises:
    receiving another command to delete another range of another file of another filesystem;
    reading metadata of the other filesystem to obtain a value of a secure erase flag for the other filesystem;
    determining that the other filesystem has a secure erase flag with a value indicating that the other filesystem is not subject to secure erasure;
    removing blocks of the other range from being accessible to the other filesystem as part of the other file; and
    in response to determining that the other filesystem has a secure erase flag with a value indicating that the other filesystem is not subject to secure erasure, freeing the blocks of the other range for re-use by the other filesystem without first overwriting the blocks of the other range.

9. The method of claim 1, wherein overwriting the block of the range using the secure erasure technique includes:
    randomly generating a set of data having a length equal to a length of the block; and
    overwriting the block with the randomly generated set of data.

10. The method of claim 1, wherein overwriting the block of the range using the secure erasure technique includes:
    encrypting contents of the block using an encryption key to generate encrypted data;
    overwriting the block with the encrypted data; and
    refraining from storing the encryption key.

11. The method of claim 1, wherein overwriting the block of the range using the secure erasure technique includes:
  generating a plurality of sets of data each having a length equal to a length of the block; and
  repeatedly overwriting the block once with each of the generated sets of data.

12. The method of claim 1, wherein:
  removing blocks of the range from being accessible to the filesystem as part of the file is performed in response to receiving the command to delete the range of the file; and
  overwriting the block and freeing the block are performed by a background process in an asynchronous manner.

13. The method of claim 1 wherein overwriting the block using the secure erasure technique is performed in response to determining that the block has a reference count indicating that the block is not shared with any other file.

14. The method of claim 1 wherein the set of blocks includes a plurality of blocks at the end portion of the file.

15. An apparatus comprising:
  persistent storage storing a filesystem;
  memory; and
  processing circuitry coupled to the memory and persistent storage, the processing circuitry being configured to:
    receive a command to delete a range of a file of the filesystem;
    in response to receiving the command to delete the range of the file, remove blocks of the range from being accessible to the filesystem as part of the file;
    overwrite a block of the range using a secure erasure technique by:
      encrypting contents of the block using an encryption key to generate encrypted data;
      overwriting the block with the encrypted data; and
      refraining from storing the encryption key; and
    subsequent to overwriting the block, free the block for re-use by the filesystem;
    wherein overwriting the block and freeing the block are performed by a background process in an asynchronous manner.

16. The apparatus of claim 15, wherein:
  receiving the command to delete the range of the file includes receiving a defragmentation command to move the range of the file to a different location; and
  removing blocks of the range from being accessible to the filesystem as part of the file includes:
    copying the blocks of the range to new locations on the persistent storage;
    copying pointers to the blocks of the range within metadata of the file to a structure for later use in locating blocks to be overwritten; and
    replacing the pointers to the blocks of the range within metadata of the file with respective pointers to the new locations on the persistent storage.

17. A computer program product, comprising a non-transitory computer-readable storage medium storing a set of instructions, which, when executed by a computing device configured to manage a filesystem stored on persistent storage, causes the computing device to:
  receive a command to delete a range of a file of the filesystem;
  in response to receiving the command to delete the range of the file, remove blocks of the range from being accessible to the filesystem as part of the file;
  overwrite a block of the range using a secure erasure technique by:
    generating a plurality of sets of data each having a length equal to a length of the block; and
    repeatedly overwriting the block once with each of the generated sets of data; and
  subsequent to overwriting the block, free the block for re-use by the filesystem;
  wherein overwriting the block and freeing the block are performed by a background process in an asynchronous manner.

18. The computer program product of claim 17, wherein:
  the file is a directory;
  receiving the command to delete the range of the file includes receiving a delete command to delete the entire directory; and
  removing blocks of the range from being accessible to the filesystem as part of the file includes removing a pointer to the directory from another directory in which the directory is located.

19. The computer program product of claim 17 wherein receiving the command to delete the range of the file includes receiving a command to delete a plurality of blocks in a middle portion of the file, the file being a sparse file, the middle portion including the set of blocks no longer at all within the file.

* * * * *